US009451522B2

United States Patent
Timus et al.

(10) Patent No.: US 9,451,522 B2
(45) Date of Patent: Sep. 20, 2016

(54) INTERFERENCE MITIGATION IN CELLULAR NETWORKS

(71) Applicant: Telefonaktiebolaget L M Ericsson (publ), Stockholm (SE)

(72) Inventors: Bogdan Timus, Spånga (SE); David Eriksson, Knivsta (SE); Muhammad Kazmi, Bromma (SE); Santhan Thangarasa, Vällingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/432,263

(22) PCT Filed: Oct. 7, 2013

(86) PCT No.: PCT/EP2013/070822
§ 371 (c)(1),
(2) Date: Mar. 30, 2015

(87) PCT Pub. No.: WO2014/053660
PCT Pub. Date: Apr. 10, 2014

(65) Prior Publication Data
US 2015/0264620 A1 Sep. 17, 2015

Related U.S. Application Data

(60) Provisional application No. 61/710,169, filed on Oct. 5, 2012.

(51) Int. Cl.
*H04W 36/00* (2009.01)
*H04W 36/32* (2009.01)
(Continued)

(52) U.S. Cl.
CPC ............ *H04W 36/32* (2013.01); *H04L 5/0073* (2013.01); *H04W 24/02* (2013.01); *H04W 48/20* (2013.01)

(58) Field of Classification Search
CPC ... H04W 36/32; H04W 36/30; H04W 80/04; H04M 1/72519
USPC ........................ 455/440, 436, 550.1; 370/331
See application file for complete search history.

(56) References Cited

U.S. PATENT DOCUMENTS 3,663,762 A * 5/1972 Joel, Jr. ................. H04W 36/12
455/439

(Continued)

OTHER PUBLICATIONS

3rd Generation Partnership Project, "3rd Generation Partnership Project; Technical Specification Group Radio Access Network; Radio Resource Control (RRC); Protocol specification (Release 11)", Technical Specification, 3GPP TS 25.331 V11.3.0, Sep. 1, 2012, pp. 1-981, 3GPP, France.

(Continued)

*Primary Examiner* — Danh Le
(74) *Attorney, Agent, or Firm* — Coats & Bennett, P.L.L.C.

(57) ABSTRACT

The present application relates to methods and devices for handling a link in a cellular network environment. A method for handling a link between a network and a mobile terminal is provided. The network comprises a first base station serving the terminal and a second base station. The method comprises the steps: determining a mobility of the terminal; determining location information of the second base station; on the basis of the determined mobility and the location information, selecting a procedure to handle the link; and initiating to perform the selected procedure. One aim is to improve the quality of the link. A corresponding apparatus is also provided.

30 Claims, 7 Drawing Sheets

(51) Int. Cl.
H04W 48/20 (2009.01)
H04L 5/00 (2006.01)
H04W 24/02 (2009.01)

(56) References Cited

U.S. PATENT DOCUMENTS

| | | | | |
|---|---|---|---|---|
| 6,771,962 B2* | 8/2004 | Saifullah | H04L 29/12311 | 455/436 |
| 2007/0060126 A1* | 3/2007 | Taniguchi | H04W 36/32 | 455/436 |
| 2010/0304680 A1* | 12/2010 | Kuffner | H04B 7/10 | 455/63.1 |
| 2011/0105147 A1* | 5/2011 | Lee | H04W 4/02 | 455/456.1 |
| 2011/0255512 A1* | 10/2011 | Lee | H04W 36/005 | 370/331 |
| 2012/0129528 A1* | 5/2012 | Kobayashi | H04W 36/0016 | 455/436 |

OTHER PUBLICATIONS

LG Electronics Inc., "Enhancement of outbound handover based on direction of movement", 3GPP TSG-RAN WG2 #79, Qingdao, China, Aug. 13 2012, pp. 1-2, R2-124003, 3GPP.

Alcatel-Lucent, et al., "UE speed-based methods and mobility state estimation for improving the mobility performance in HetNets", 3GPP TSG-RAN WG2 meeting #78, Prague, Czech Republic, May 21, 2012, pp. 1-10, R2-122813, 3GPP.

Alcatel-Lucent, et al., "Summary of Proposed Solutions for HetNet Mobility Enhancement", 3GPP TSG-RAN WG2 meeting #81, Malta, Jan. 28, 2013, pp. 1-6, R2-130101, 3GPP.

Shen, X., et al., "Further Enhanced Non CA-based ICIC for LTE", 3GPP Work Item, Mar. 23, 2013, pp. 1-6, 3GPP.

Shen, X., et al., "Further Enhanced Non CA-based ICIC for LTE—Performance part", 3GPP Work Item, Mar. 23, 2011, pp. 1-5, unique identifier: 510221, 3GPP.

Shen, X., et al., "Further Enhanced Non CA-based ICIC for LTE—Core part", 3GPP Work Item, Mar. 23, 2011, pp. 1-6, unique identifier: 510121, 3GPP.

CMCC, "New Study Item Proposal: Scenarios and Requirements of LTE Small Cell Enhancements", 3GPP TSG RAN#57, Chicago, Sep. 4, 2012, pp. 1-5, RP-121418, 3GPP.

Huawei, et al., "Proposed SID: Study on UMTS Heterogeneous Networks", TSG RAN Meeting #57, Chicago, Sep. 4, 2012, pp. 1-5, RP-121436, 3GPP.

3rd Generation Partnership Project, "3rd Generation Partnership Project; Technical Specification Group Radio Access Network; Evolved Universal Terrestrial Radio Access Network (E-UTRAN); X2 application protocol (X2AP) (Release 11)", Technical Specification, 3GPP TS 36.423 V11.2.0, Sep. 1, 2012, pp. 1-136, 3GPP, France.

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 11)", Technical Specification, 3GPP TS 36.331 V11.1.0, Sep. 1, 2012, pp. 1-325, 3GPP, France.

* cited by examiner

INTERFERENCE MITIGATION IN CELLULAR NETWORKS

TECHNICAL FIELD

The present application relates to methods for handling a link between a network and a mobile terminal in a cellular network environment. The link is e.g. handled such that link quality is improved, interference is mitigated and/or a number of handovers is reduced. The application further relates to corresponding apparatuses, such as networks, network nodes and terminals. In particular, heterogeneous network environments are considered.

BACKGROUND

In mobile communications networks, such as 3GPP networks (3GPP: Third Generation Partnership Project), there is a continuing need for higher data throughput. In order to achieve higher throughputs, various techniques are employed. One approach is to extensively use the limited frequency resources to obtain wide frequency bands for radio communication. This can result in a situation where two or more access nodes communicate over radio interfaces with UEs (UE: user equipment) using at least partially overlapping frequency bands.

If the two or more access nodes use at least partially overlapping frequency bands, spectral interference is likely to occur. Spectral interference can describe a situation where the radio interface between a UE and a first access node is disturbed by a radio interface of a second access node emitting power in the same frequency bands.

Spectral interference can have different effects. One possible effect is a degraded reliability of the radio interface, i.e., a higher probability for lost data packets or radio frames. This may effect the experienced communication quality in an undesired manner voice communication may be disturbed and data communication may be delayed. In certain scenarios, the connection between the UE and the respective access node may even be lost.

A situation of spectral interference can, in particular, occur for so-called heterogeneous networks. In heterogeneous networks, an access node with comparably large coverage, also referred to as macro access node, is supplemented by one or more access nodes of lower power which hence have a smaller coverage (cell size). Latter low-power access nodes are sometimes referred to as pico access nodes and can be deployed closer to the end users, e.g., on street level. Pico access nodes may be situated, preferably, in areas encountering large amounts of data traffic where there is a large demand for capacity. The pico access nodes can then reduce the load imposed on the macro access node and thereby help to increase overall throughput. Often, pico and macro nodes have at least partially overlapping cells.

In heterogeneous networks, a situation where the pico access nodes share the same frequency bands with the macro access nodes often occurs. In particular, a so-called frequency reuse of 1 is often employed where, both, macro and pico access nodes share the entire spectrum to maximize throughput. In other words, different signals may be transmitted via the same frequency band. Due to the overlapping cells, a situation of increased spectral interference may occur.

In case a high speed terminal (UE), i.e. a terminal moving with high speed, connected to a macro cell approaches a small cell the terminal may experience a sudden increase of the interference level. The consequence may be that the UE may not be able to decode any longer the control messages sent by the serving macro cell and the service quality in general is degraded. Therefore, in such a case, the terminal may not be able to perform handover procedures and the radio connection may eventually be broken.

The UEs may loose the connection with serving macro cell before the handover procedures have been executed. Even if the handover can be successfully executed, the UE may suffer from repeated handovers due to the small size of the cells.

In the described situations there is a need to improve the radio link quality between the wireless network and the UE.

SUMMARY

It is an object to obviate at least some of the above disadvantages and provide improved methods, nodes and terminals for telecommunications.

According to one aspect, a method for handling a link between a network and a mobile terminal is provided. The network comprises a first base station serving the terminal and a second base station. The method comprising the steps: determining a mobility of the terminal; determining location information of the second base station; on the basis of the determined mobility and the location information, selecting a procedure to handle the link; and initiating to perform the selected procedure.

According to another aspect, an apparatus for handling a link between a network and a terminal is provided. The network comprises a first base station serving the terminal and a second base station. The node comprising a processor for determining a mobility of the terminal, for determining location information of the second base station, for selecting, on the basis of the mobility and the location information, a procedure to handle link; and for initiating to perform the selected procedure.

Certain embodiments help to reduce the amount of required handovers for moving terminals and/or to reduce interference and/or to perform reliable handover in case the handover cannot reasonably be avoided.

It is to be understood that the features mentioned above and those yet to be explained below may be used not only in the respective combinations indicated, but also in other combinations or in isolation without departing from the scope of the application.

BRIEF DESCRIPTION OF THE DRAWINGS

In the following, the embodiments will be explained in further detail and illustrated in the accompanying drawings.

DETAILED DESCRIPTION

Figure 1:
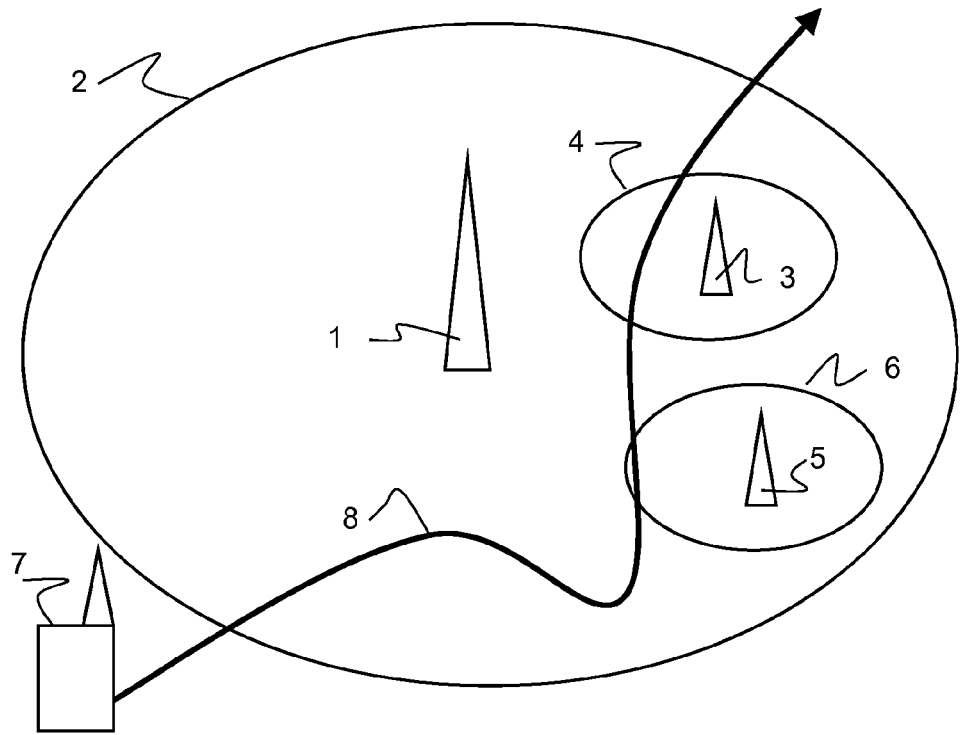
FIG. 1 schematically illustrates an exemplary a mobile communication network environment in which concepts according to various embodiments can be applied.

In the following, exemplary embodiments will be explained in more detail by referring to the accompanying drawings. At first, however, specific concepts which are of importance to some embodiments are discussed.

Firstly it is focused on heterogeneous networks. Low power nodes (LPN), also called micro, pico and femto or home base stations, typically have significantly lower cell area than a macro cell. If a small cell is crossed by a UE at high speed, then the time spent in the cell is rather small. This means that the UE possibly undergoes a large number of handovers in a short period of time. This increases the signaling load, increases the probability of handover failure, and in general increases the risk of degraded service quality.

A possible solution is to place the high power node (HPN) such as macro cell and the LPN such as pico cell on different carriers, so that they do not interfere with each other. In second generation systems such as GSM, the solution is called hierarchical cell system (HCS) and is well known for more than 20 years. With such a system it is possible to let high speed users to be served by the macro layer so as to avoid frequent handovers.

However, if the macro and pico cells are on the same carrier frequency, then the interference level produced by the pico cells on the downlink could make the transmission unsustainable. Moreover, the split of radio resources so as to accommodate the macro and pico cells on different carriers is typically inefficient. For the scope of this discussion, it is assumed that the macro and the pico cells operate on the same carrier, such that transmissions from macro and pico base stations overlap at least partly in the frequency domain.

A more significant problem is that the change in signal strength is typically quite sudden when approaching a small cell, especially if the UE is moving fast. For a UE connected to a macro cell, this means that it may suddenly experience very high interference from a small cell. In the worst case, the interference is so strong that the UE cannot decode the control messages sent from the macro cell, messages which may contain for instance a handover command. Hence, even if a handover from the macro to the pico cells would be desired, it might be difficult to execute the handover procedure.

There are many known problems with the interference between macro and pico. For instance, when using cell range extension so that the coverage area of a pico gets larger, the users in the extended areas are connected to the pico although they receive stronger signals from the macro.

To mitigate the interference the time domain enhanced inter-cell interference coordination ICIC (eICIC) has been specified in 3GPP specifications in release 10 for LTE. In HSPA there is an ongoing study item in release 12 to study the inter-cell interference mitigation in heterogeneous network deployment scenario.

In time domain scheme which is used in LTE there is resource partitioning in time domain between the aggressor cell and the victim cell to mitigate the interference towards the victim cells. This mechanism is being further enhanced in Rel-11. According to a time domain eICIC scheme the subframe utilization across different cells is coordinated in time through backhaul signaling i.e. over X2 between eNBs. The subframe utilization is expressed in terms of a time domain pattern of low interference subframes or 'low interference transmit pattern'. More specifically they are called as Almost Blank Subframe (ABS) patterns. The Almost Blank Subframes (ABSs) are configured in an aggressor cell (e.g. macro cell) and are used to protect resources in subframes in the victim cell (e.g. pico cell) receiving strong inter-cell interference. Almost blank subframes are subframes configured in an aggressor cell with reduced transmit power or no transmission power and/or reduced activity on some of the physical channels. In an ABS subframe the basic common physical channels such as cell-specific reference signal (CRS), PSS/SSS, PBCH and SIB1 are transmitted to ensure the operation of the legacy UEs.

A LPN can also belong to Closed Subscriber Group (CSG), whose owner allows only access to a limited number of subscribers. This means forbidden users even close to a CSG based LPN cannot be served by the best cell (i.e. LPN). Hence the opposite situation occurs when Closed Subscriber Group (CSG) is used in a low power node (e.g. a home base station serving a femto cell), i.e., when the CSG node is configured to allow access only to a predefined list of users. If a UE is located close to the pico but is not part of the CSG, then the UE will remain connected to the macro cell and receive a lot of downlink interference from the CSG based LPN (e.g. CSG HeNB). It will also generate a lot of uplink interference to the LPN. The ABS are defined in 3GPP TS 36.423 in a generic manner and therefore can be configured in any base station i.e. in a macro base station or in any LPN (e.g. pico BS, HeNB etc). Therefore a solution is to apply the ABS mechanism at the LPN, which essentially means that the LPN does not transmit data or other UE specific signaling in some subframes (i.e. in ABS) in which the macro can schedule the vulnerable UEs. In this way the victim UE can receive data from the macro cell when such UE is in vicinity of an aggressor CSG based LPN.

One approach to the handover problem is to let the signaling messages pass through the pico instead of the macro, i.e., from the target cell. This is different than the approach implemented in most of the traditional radio networks, in which the handover commands with information about the target cell come through the serving cell. This is sent using RRC protocol. The RRC signaling for handover command is defined in TS 25.331 and TS 36.331 for HSPA and LTE respectively.

Secondly, it is focused on Mobility Scenarios. Fundamentally there are two kinds of UE mobility states. One is low activity state mobility or cell change. Examples of this scenario are cell selection, cell reselection etc. Another is connected state mobility or cell change. Examples of this scenario are handover, cell change order, RRC re-direction upon connection release, RRC connection re-establishment, primary serving cell change in multi-carrier systems, primary serving carrier change in multi-carrier systems, primary link or connection change in multi-point/CoMP systems etc.

In LTE there is only one low activity mobility state called idle state. In HSPA there are following low activity states: Idle state; URA_PCH state; CELL_PCH state; CELL_FACH state.

Nevertheless in any low activity state the UE autonomously performs cell reselection without any direct intervention of the network. But to some extent the UE behavior in low activity mobility state scenario could still be controlled by a number of broadcasted system parameters and performance specification.

In HSPA the connected state is also called as CELL_DCH state since at least a dedicated channel (DCH) is in operation for at least the maintenance of the radio link quality.

The cell change in connected state (e.g. handover) on the other hand is fully controlled by the network through explicit signaling (e.g. UE specific commands) and by performance specification.

Similarly RRC re-direction upon connection release mechanism is used by the network to re-direct the UE to change to another cell which may belong to the RAT of the serving cell or to another RAT. In this case the UE upon receiving the 'RRC re-direction upon connection release' command typically goes in idle state, search for the indicated cell/RAT and accesses the new cell/RAT.

In both low activity state and connected state the mobility decisions are mainly based on the same kind of downlink neighbor cell measurements, which were discussed in the previous section.

Both WCDMA and E-UTRAN are frequency reuse-1 systems. This means the geographically closest or physical adjacent neighbor cells operate on the same carrier frequency. An operator may also deploy multiple frequency layers within the same coverage area. Therefore, idle mode and connected mode mobility in both WCDMA and E-UTRAN could be broadly classified into three main categories: Intra-frequency mobility (low activity and connected states); Inter-frequency mobility (low activity and connected states); Inter-RAT mobility (low activity and connected states).

In intra-frequency mobility UE moves between the cells belonging to the same carrier frequency. This is the most important mobility scenario since it involves less cost in terms of delay as mobility measurements can be carried out in parallel with channel reception. In addition an operator would have at least one carrier at its disposal that it would like it to be efficiently utilized.

In inter-frequency mobility the UE moves between cells belonging to different carrier frequencies but of the same access technology. The carriers before and after the inter-frequency cell change may belong to the same frequency band (aka intra-band inter-frequency cell change) or the carriers may belong to different frequency bands (aka inter-band or cross-band inter-frequency cell change).

In inter-RAT mobility the UE moves between cells that belong to different access technologies such as between WCDMA and GSM or vice versa or between WCDMA and LTE or vice versa and so on. Some of the frequency bands are common for different technologies e.g. band 3 (1800 GHz), band 8 (900 MHz) are specified for LTE, WCDMA and GSM. Therefore inter-RAT cell change can be intra-band inter-RAT cell change or it can be inter-band/cross-band inter-RAT cell change.

To take mobility decisions one or more UE measurements (aka DL measurements) are used. The network may even use network related measurements like BS transmit power etc.

In WCDMA single carrier system the following three UE (downlink) serving and neighbor cell measurements are specified primarily for mobility purpose: common pilot channel received signal code power (CPICH RSCP); (CPICH Ec/No; CPICH Ec/No=CPICH RSCP/carrier RSSI); (UTRA Carrier RSSI).

The RSCP is measured by the UE on cell level basis on the common pilot channel (CPICH). The UTRA carrier RSSI is measured over the entire carrier. It is the total received power and noise from all cells (including serving cells) on the same carrier. The above CPICH measurements are the main quantities used for the mobility decisions.

In E-UTRAN the following two downlink serving and neighbor cell measurements are specified also primarily for mobility purpose: Reference symbol received power (RSRP); Reference symbol received quality (RSRQ): RSRQ=RSRP/carrier RSSI.

The RSRP or RSRP part in RSRQ in E-UTRAN is solely measured by the UE on cell level basis on reference symbols. The E-UTRA carrier RSSI is measured over the configured measurement BW up to the entire carrier BW. It is also the total received power and noise from all cells (including serving cells) on the same carrier. The two RS based measurements are indeed also the main quantities, which are likely to be used for the mobility decisions.

Thirdly, a positioning overview is given. Several positioning methods for determining the location of the target device, which can be a UE, mobile relay, PDA etc exist. The well known methods are: Satellite based methods: it uses A-GNSS (e.g. A-GPS) measurements for determining UE position. OTDOA: it uses UE RSTD measurement for determining UE position in LTE. UTDOA: it uses measurements done at LMU for determining UE position. Enhanced cell ID: it uses one or more of UE Rx-Tx time difference, BS Rx-Tx time difference, LTE P/RSRQ, HSPA CPICH measurements, angle of arrival (AoA) etc for determining UE position. Hybrid methods: it uses measurements from more than one method for determining UE position.

In LTE the positioning node (aka E-SMLC or location server) configures the UE, eNode B or LMU to perform one or more positioning measurements. The positioning measurements are used by the UE or positioning node to determine the UE location. The positioning node communicates with UE and eNode B in LTE using LPP and LPPa protocols.

Fourthly, it is focused on Multi-Carrier or Carrier Aggregation Concepts. To enhance peak-rates within a technology, multi-carrier or carrier aggregation solutions are known. Each carrier in multi-carrier or carrier aggregation system is generally termed as a component carrier (CC) or sometimes it is also referred to as a cell. In simple words the component carrier (CC) means an individual carrier in a multi-carrier system. The term carrier aggregation (CA) is also called (e.g. interchangeably called) "multi-carrier system", "multi-cell operation", "multi-carrier operation", "multi-carrier" transmission and/or reception. This means the CA is used for transmission of signaling and data in the uplink and downlink directions. One of the CCs is the primary component carrier (PCC) or simply primary carrier or even anchor carrier. The remaining ones are called secondary component carrier (SCC) or simply secondary carriers or even supplementary carriers. Generally the primary or anchor CC carries the essential UE specific signaling. The primary CC carries the control and data. The SCC carries typically only user data. Therefore the PCC exists in both uplink direction for UL control and data and as well as in DL direction when UE is configured in CA. The network may assign different primary carriers to different UEs operating in the same sector or cell.

Therefore the UE has more than one serving cell in downlink and/or in the uplink: one primary serving cell and one or more secondary serving cells operating on the PCC and SCC respectively. The serving cell is interchangeably called as primary cell (PCell) or primary serving cell (PSC). Similarly the secondary serving cell is interchangeably called as secondary cell (SCell) or secondary serving cell (SSC). Regardless of the terminology, the PCell and SCell(s) enable the UE to receive and/or transmit data. More specifically the PCell and SCell exist in DL and UL for the reception and transmission of data by the UE. The remaining non-serving cells on the PCC and SCC are called neighbor cells.

The CCs belonging to the CA may belong to the same frequency band (aka intra-band CA) or to different frequency band (inter-band CA) or any combination thereof (e.g. 2 CCs in band A and 1 CC in band B). Furthermore the CCs in intra-band CA may be adjacent or non-adjacent in frequency domain (aka intra-band non-adjacent CA). A hybrid CA comprising of intra-band adjacent, intra-band non-adjacent and inter-band is also possible. Using carrier aggregation between carriers of different technologies is also referred to as "multi-RAT carrier aggregation" or "multi-RAT-multi-carrier system" or simply "inter-RAT carrier aggregation". For example, the carriers from WCDMA and LTE may be aggregated. Another example is the aggregation of LTE and CDMA2000 carriers. For the sake of clarity the carrier aggregation within the same technology as described can be regarded as 'intra-RAT' or simply 'single RAT' carrier aggregation.

The CCs in CA may or may not be co-located in the same site or base station or radio network node (e.g. relay, mobile relay etc). For instance the CCs may originate (i.e. transmitted/received) at different locations (e.g. from non-located BS or from BS and RRH or RRU). The well known examples of combined CA and multi-point communication are DAS, RRH, RRU, CoMP, multi-point transmission/reception etc. Various embodiments also apply to the multi-point carrier aggregation systems. The multi-carrier operation may also be used in conjunction with multi-antenna transmission. For example signals on each CC may be transmitted by the eNB to the UE over two or more antennas.

Fifthly, it is focused on multipoint operation. In multipoint operation more than one radio link serve the UE. Each radio link can be viewed as a transmission from a cell. The multipoint operation covers reception of data through multiple radio links at the UE from two or more radio nodes and/or reception of data through multiple radio links at two or more radio nodes. The radio links typically belong to different cells which may be served by the same site or different sites. More commonly used terms for multipoint operation are coordinated multi-point (CoMP), multi-cell or multi-point transmission, multi-cell or multi-point transmission and/or reception etc. multipoint HSDPA etc. The multipoint operation is used in HSPA and LTE.

In LTE DL CoMP typically multiple geographically separated transmission points dynamically coordinate their transmission. The UE may combine the received signals depending upon the reception scheme used at the UE or configured by the network.

Few examples of multi-cell transmissions techniques in HSDPA include: Switched transmit diversity techniques (e.g., HS-DDTx or SF-DC-HSDPA switching): In this case HSDPA transmissions from different cells are coordinated so that the inter-cell interference is minimized; Multi-flow transmission techniques (e.g. SF-DC-HSDPA aggregation): In this case independent data streams are transmitted to the same UE from different cells located in the same or different sites; Single frequency network transmission (e.g. HS-SFN): In this case identical data is sent to the UE from multiple cells simultaneously. This technique is based on that the transmitted data is combined in the "air" and the UE receiver transparently receives the combined signal.

The multi-cell transmission can also be multi-frequency multi-cell HSDPA (MF-MC-HSDPA). A special case of MF-MC-HSDPA is DF-DC-HSDPA in which two independent data streams are transmitted over two different carrier frequencies to the same UE from the cells located in the same or different sites.

The multipoint operation in HSDPA is part of the study under the SI on "Study on UMTS Heterogeneous Networks".

FIG. 1 shows an exemplary network environment in which concepts of various embodiments may be applied. The base station 1 serves a coverage area 2. The base stations 3 and 5 operate on lower power and serve a coverage area 4 and 6 respectively. The bases stations 1, 3 and 5 may also be referred to as radio network nodes 1, 3 and 5, respectively. The mobile terminal 7 moves along the trajectory 8. Existing handover procedures suggest that a handover or cell change from one cell to another cell is performed, when the terminal approaches the coverage area of the respective neighboring cell. Accordingly, when moving along the trajectory 8, the terminal 7 is handed over to base station 1, then to base station 5, then to base station 1, then to base station 3, and then to base station 1. In case the terminal 7 is moving fast, the handover to and from the base stations 3 and 5 are possibly not desired as several handovers increase signaling overhead and any handover potentially includes the risk that a radio link from the serving base station to the terminal gets lost and a handover to a target base station fails. In this case the radio link between the network and the terminal fails. For simplicity radio link is interchangeably used with link but they bear the same meaning. Furthermore, processing time required for a potential handover my effect the user experience of a certain service and may increase delay in the communication between the network and the terminal. So, there is a wish to avoid handovers as far as possible in certain cases, e.g. when the terminal is moving fast and many handovers are required on the trajectory of movement. In addition, when the terminal 7 comes close to the base station 3 or the base station 5, interference can become suddenly very high and control signaling from base station 1 to terminal 7 might not be received anymore. This is particularly the case when the base stations 3 and 5 operate on the same frequency as the base station 1. Further the link quality between the base station 1 and the mobile terminal 7 will generally suffer due to interference from the base stations 3 and 5 when the mobile terminal is close to these base stations, e.g. when the terminal 7 is within the coverage area 4 or 6.

According to one aspect a method for handling a link between a network and a mobile terminal is provided. The network comprises a first base station serving the mobile terminal and a second base station. The method comprises the steps: determining a mobility of the terminal served by the first base station; determining location information of the second base station; selecting, on the basis of the mobility and the location information a procedure to handle the link; and initiating to perform the selected procedure.

A link is e.g. handled by improving the quality of the link, by avoiding a handover or by performing a handover or by mitigating interference and so on. The procedure to improve link quality may be a handover procedure or a procedure to mitigate interference.

The method may run or be operated in the network, in a node of the network or in the terminal. The node may be the first base station, the second base station, another node of the wireless networked or the terminal. The link handled is normally between a base station of the wireless network and the terminal Selecting a procedure to handle the link relates to the determination of a suited procedure to encounter a particular situation identified by the determined mobility profile and location information. The second base station is normally a neighboring base station. The second base station normally provides a cell having at least partial overlap with the cell provided by the first base station.

The selection step may be performed as follows: Selecting, on the basis of the mobility profile and the location information, whether to perform a handover procedure to the second base station or a procedure to mitigate interference from the second base station.

The handover procedure to the second base station may also be a cell change procedure to the second base station.

In one embodiment, it may be selected to mitigate interference from the second base station instead of handing the terminal over to the second base station. In this way a handover to the second base station may be avoided. The selection is based on the determined mobility of the terminal and the location information of the second base station. For example, based on the mobility and location information upcoming interference scenarios are predicted or a quality of the link is predicted. Here it may be predicted that the quality of the link will diminish. Based on the prediction a suited procedure is selected to keep the quality of the link on a sufficient level.

The method may comprise the step: checking whether the quality of the link can be improved by a procedure to handle the link. The check may be performed on the on the basis of the determined mobility and the location information. The procedure to handle the link may then be selected according to the check. So, for example, if the check reveals that the link quality can be improved by a particular procedure to handle the link, then this procedure is selected.

In other words, the method may further comprise the steps: Predicting a link quality of the link between the network and the terminal; and selecting a procedure to handle the link also on the basis of the prediction. The prediction may be based on the mobility of the terminal and the location information. The link quality may be predicted for several different procedures for handling the link such as a handover to the second base station or mitigating interference from the second base station without handover to the second base station. For example, the procedure showing the best predicted quality is selected. A link quality may be best if a frequency of handovers is kept low and/or if interference is kept under a certain limit. Basically, the procedure to handle a link is selected such that link quality is improved or optimized.

The method may further comprise selecting the procedure to handle the link also on the basis of a service used by the terminal. This may require that the service is determined first.

The procedure to handle the link between the network and a terminal may also be selected on the basis a probability of a failure for handovers of the terminal between the first and the second base station.

The method may further comprise at least one of the following steps: Determining a probability that the terminal will enter a coverage area of the second base station; Determining a probability that the terminal will stay in coverage of the second bases station at least for a predefined period of time; Determining an expected duration, the terminal will spent in a coverage area of the second base station; Determining an expected impact or level of interference between the terminal and the second base station; Determining a first signal quality between the first base station and the terminal; and determining a second signal quality between the second base station and the terminal. The respective determination may be done on the basis of the mobility of the terminal and the location information of the second base station. The selection of a procedure to handle the link can also be made on the basis of at least one of the probability to enter a coverage area of the second base station, the probability to stay within a coverage area of the second base station, the expected duration to stay the first signal quality, the second signal quality, and the expected impact or level of interference.

The method may comprise the step: Receiving a recommendation for a procedure to handle the link from another node. For example, the terminal sends a recommendation of a selected procedure to handle the link to another node such as a network node or the first base station. The procedure to handle the link may then be selected also on the basis of the received recommendation.

The method may comprise the step of sending the selected procedure as a recommendation to another node. For example, the terminal may send the procedure the terminal selected to the first base station as a recommendation. The first base station may then consider this recommendation for a final selection of the procedure to handle the link.

The terminal may also or alternatively base its recommendation of a procedure to handle the link on a signal quality of the first base station and/or the signal quality of the second base station. The signal qualities may be determined by the terminal.

One option to handle the link or to improve link quality is to reduce interference experienced by the terminal. Link quality can also be improved or the link can be handled by protecting control signaling send from the first or second base station to the terminal and/or the way round. The link quality is also improved or the link is handled by reducing the number of required handovers. Link quality may also be improved or the link is handled by handing the terminal over to the second base station or another base station.

Preferably, the procedure which is most suited in terms of improved link quality, improved quality of service, reduced interference, reduced number of handovers and/or reduced signaling overhead is selected. The selected procedure may be at least partly be performed by the network, the network node, the base station, the terminal or any combination thereof.

The wireless network may by heterogeneous. The first base station may be operated on a higher power level than the second base station. In this context, normally, the first and the second base station operate on the same frequency.

In this context, normally, a coverage area of the first base station overlaps with a coverage area of the second base station. The coverage area of the first base station may also cover the coverage area of the second base station. The second base station may be within a pre-defined distance from the first base station.

The mobility of the terminal may e.g. be determined based on timers. For example, when a terminal is moving fast it normally spends only very little time in a cell such as a pico cell. So, when a terminal has left a cell before a timer is expired, it can be detected that the terminal is a fast moving terminal.

The mobility of the terminal may comprise a mobility profile of the terminal. The mobility profile of the terminal may comprise parameters such as speed of the terminal, direction of motion of the terminal, position or location of the terminal and so on. The mobility profile may also or alternatively comprise a mobility classification such as high, low, or fast, slow, medium and so on. The mobility profile may also or alternatively comprise an acceleration of the terminal and/or a path of motion.

Examples of location information of the second base station are geographical location of the second base station and location information of the second base station in relation to the first base station.

A procedure to be selected can be at least one of the following: Configuring a low interference (e.g., almost blank or silent) time-frequency resource (e.g. ABS) in the second base station to protect the terminal from interference caused by the second base station; Performing a cell change of the terminal to a cell operating on a frequency different to the frequency of the first and/or the second base station (e.g. inter-frequency handover or inter-RAT handover to a RAT using a different frequency); Performing a cell change of the terminal to a cell operating on a radio access technology different to the radio access technology of the first base station and/or the second base station; Preventing the configuration of a low interference time-frequency resource (e.g. ABS) in the second base station and/or a cell change; Introducing time shifting between transmissions of the first base station and transmissions of the second base station; Sending signaling via a channel having higher reliability and/or configuring the terminal accordingly; and Sending signaling (e.g. control signaling to the terminal) and/or data via the second base station.

One aim of the methods is to reduce the number of handovers and/or to protect the mobile terminal from interference. For example, for a fast moving terminal a handover from a first base station having higher power (e.g. a base station of a macro layer) to a second base station having lower power (e.g. a base station of a pico layer), the handover to the second base station can be avoided. In certain situations however, interference can be reduced by performing a handover to the second base station. So it may be decided whether to perform the handover or not. The decision may be based on the determined mobility and location information, from which certain upcoming situations may be predicted.

In case the first base station operates on a higher power than the second base station, one aim is to keep the terminal, in particular a fast moving terminal, connected to the first base station (or to base stations of the higher power level) instead of handing them over to the second base station (or to base stations of the lower power level). In this way many handovers to a base station of lower power can be avoided in particular for fast moving terminals. This helps to reduce the total number of handovers required by a moving terminal. At the same time the communication, in particular the control signaling, between the first base station and the terminal may be protected from interference from the second base station.

Figure 2:
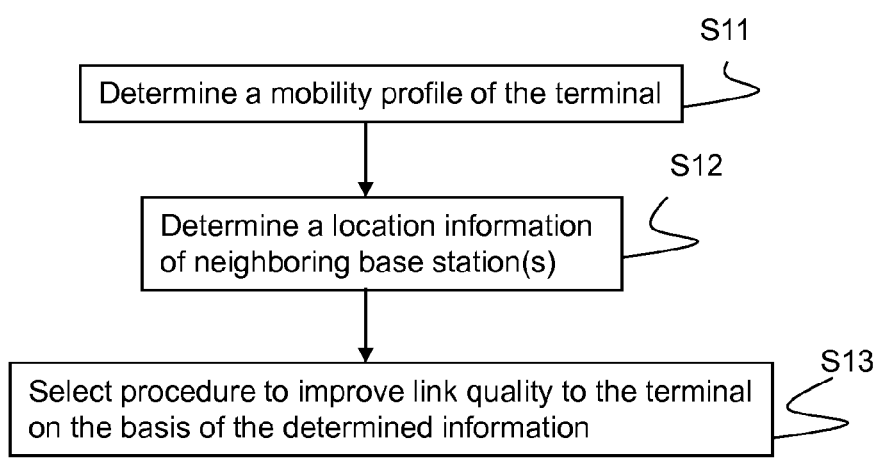
FIG. 2 illustrates a flowchart of a method according to various embodiments.

FIG. 2 shows an exemplary flowchart of a method according to concepts of the first embodiment. In a first step S1, a mobility (such as a mobility profile) of a terminal is determined. In a second step S21, location information from one or more neighboring base stations is determined. Based on the information it is checked whether the link quality can be improved with a particular mobility function, such as the procedures to improve link quality or to handle the link as discussed above. The particular procedure is then selected to improve link quality (S13). With it, the number of required handovers may be reduced, signaling overhead is improved or interference is reduced.

Particularly if the method runs in a terminal, but also if the method runs in any other node a procedure to be selected can be additionally at least one of the following: Preventing handover or cell change to the second base station; Selecting a receiver procedure to mitigate interference from the second base station; and Performing a cell reselection to a cell operating on a different frequency (as the frequency used by the first and/or the second base station) or RAT or both.

According to a further aspect an apparatus for handling a link between a network and a terminal is provided. The network comprises a first base station serving a mobile terminal and a second base station. The apparatus comprises a processor for determining a mobility of the terminal served by the first base station; for determining location information of the second base station; for selecting, on the basis of the mobility and the location information a procedure to improve the link quality; and for initiating to perform the selected procedure.

A link is e.g. handled by improving the quality of the link, by avoiding a handover or by performing a handover or by mitigating interference and so on. The procedure to improve link quality may be a handover procedure and/or a procedure to mitigate interference.

The apparatus may be a node of the network or a network. The apparatus may be the first base station, the second base station, another node of the wireless networked or the terminal.

The link handled is normally between a base station of the wireless network and the terminal. Selecting a procedure to handle the link relates to the determination of a suited procedure to encounter a particular situation identified by the determined mobility and location information. The second base station is normally a neighboring base station. The second base station normally provides a cell having at least partial overlap with the cell provided by the first base station.

The processor for selection may further be constructed or configured as follows: processor for selecting, on the basis of the mobility and the location information, whether to perform a handover procedure to the second base station or a procedure to mitigate interference from the second base station.

The procedure to handle the link or to improve link quality may be a handover procedure or a procedure to mitigate interference.

The apparatus may be generally adapted or configured to perform the methods as presented in the context of the aspect discussed earlier comprising a method for handling a link. The apparatus may generally be configured to perform concepts and steps according to various discussed embodiments.

Figure 3:
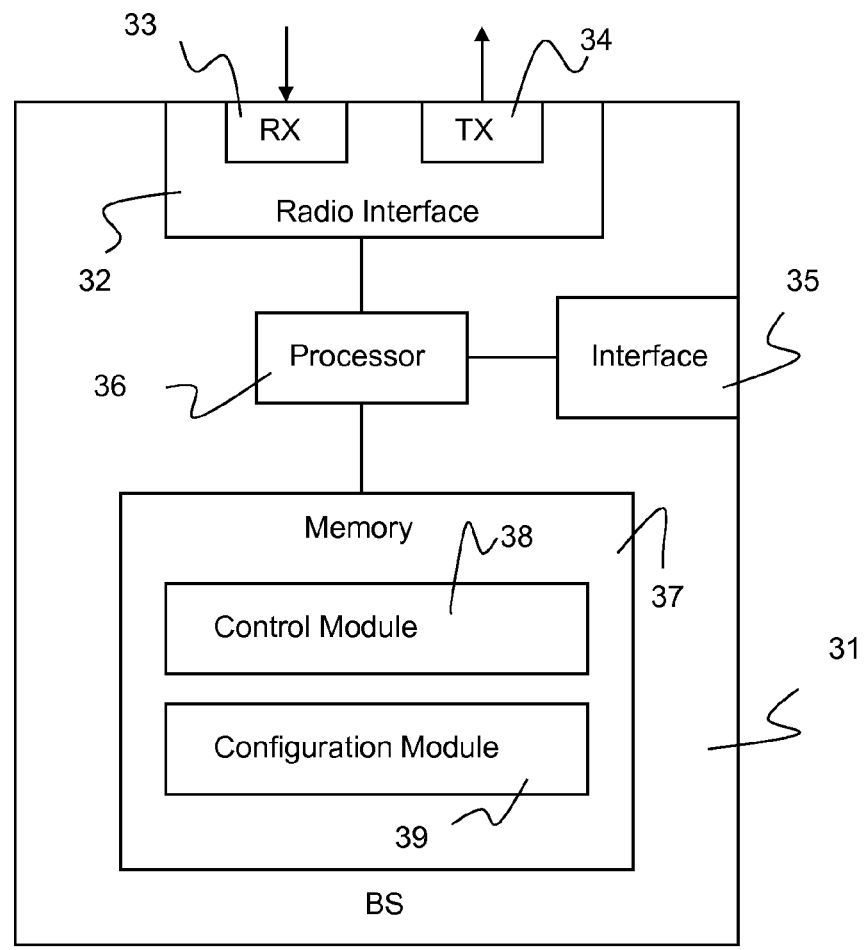
FIG. 3 schematically illustrates exemplary structures of a network node according to various embodiments.

FIG. 3 schematically illustrates exemplary structures for implementing a network node 31 according to various embodiments. In the illustrated structure, the network node 31 includes a radio interface 32 for data transmission to or from the terminal 51. It is to be understood that for implementing transmitter (TX) functionalities the radio interface 902 may include one or more transmitters 34, and that for implementing receiver (RX) functionalities the radio interface 33 may include one or more receivers 32. The network node 31 includes a processor 36 coupled to the interfaces 32 and 35 and a memory 37 coupled to the processor 36. The memory 160 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 37 includes suitably configured program code to be executed by the processor 36 so as to implement the above-described functionalities of the network node 31. More specifically, the memory 37 may include a control module 38 for accomplishing the above-described concepts such as determining a mobility of the terminal served by the first base station and determining a location information of the second base station; Further, the memory 37 may include a configuration module 39 for, selecting a procedure to handle the link or. The processer 36 may receive further information via Interface 35 or via Radio interface 32 used to determine the mobility and/or the location information.

It is to be understood that the structure as illustrated in FIG. 3 is merely schematic and that the network node 31 may actually include further components which, for the sake of clarity, have not been illustrated, e.g., further interfaces or additional processors. Also, it is to be understood that the memory 37 may include further types of program code modules, which have not been illustrated. For example, the memory 37 may include program code modules for implementing typical functionalities of a base station, e.g., known functionalities of an eNodeB.

According to some embodiments, also a computer program product may be provided for implementing concepts according to various embodiments, e.g., a computer readable medium storing the program code and/or other data to be stored in the memory 37.

Figure 4:
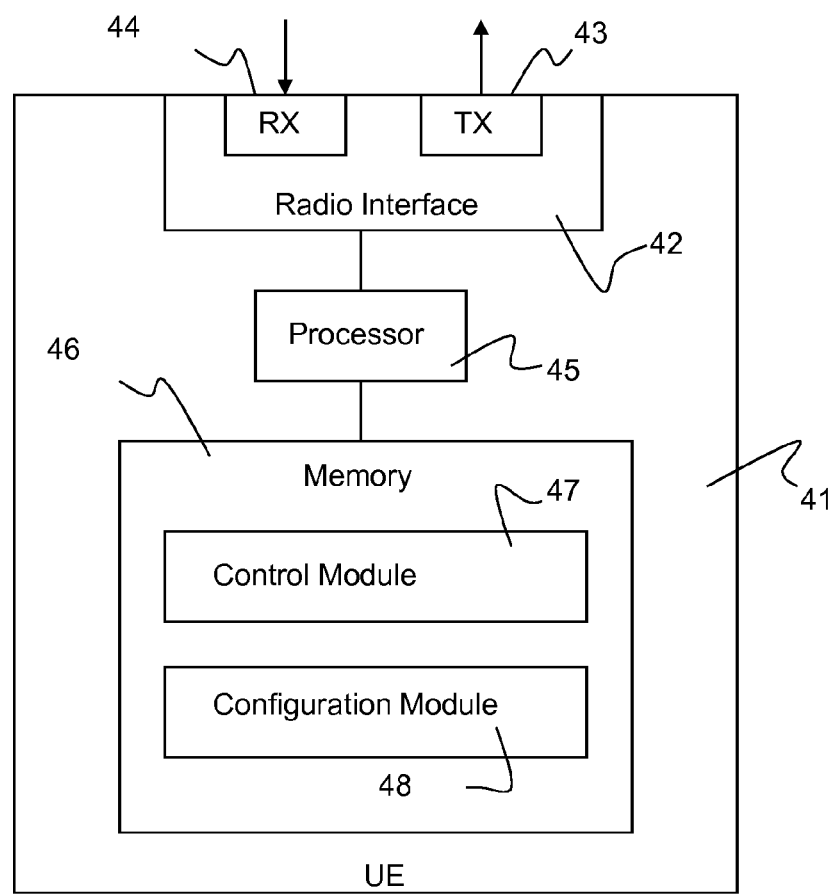
FIG. 4 schematically illustrates exemplary structures of a terminal according to various embodiments.

FIG. 4 schematically illustrates exemplary structures for implementing the above-described concepts in a terminal 41. In the illustrated structure, the terminal 41 includes a radio interface 42 for performing data transmission to or from a mobile network, e.g., via the network node 31. It is to be understood that for implementing transmitter (TX) functionalities the radio interface 42 includes one or more transmitters 43 and that for implementing receiver (RX) functionalities the radio interface 42 may include one or more receivers 44.

The terminal 41 includes a processor 45 coupled to the radio interface 42 and a memory 46 coupled to the processor 45. The memory 46 may include a ROM, e.g., a flash ROM, a RAM, e.g., a DRAM or SRAM, a mass storage, e.g., a hard disk or solid state disk, or the like. The memory 46 includes suitably configured program code to be executed by the processor 45 so as to implement the above-described functionalities of the terminal 41. More specifically, the memory 46 may include a control module 47 which e.g. determines a mobility of the terminal served by the first base station and determines location information of the second base station. The processer 45 may receive further information via the radio interface 42 to determine the mobility and/or the location information. Further, the memory 46 may include a configuration module 48 for selecting a procedure to handle the link between the network and the terminal 41.

It is to be understood that the structure as illustrated in FIG. 4 is merely schematic and that the terminal 41 may actually include further components which, for the sake of clarity, have not been illustrated, e.g., further interfaces or additional processors. Also, it is to be understood that the memory 46 may include further types of program code modules, which have not been illustrated. For example, the memory 46 may include program code modules for implementing typical functionalities of a terminal or program code of one or more applications to be executed by the processor 45.

According to some embodiments, also a computer program product may be provided for implementing concepts according to various embodiments, e.g., a computer-readable medium storing the program code and/or other data to be stored in the memory 46.

Subsequently further concepts, developments, and embodiments are discussed with respect to FIGS. 5, 6, 7 and 8. Some concepts already discussed above are also discussed here in further detail. The terminal is also referenced as UE, the first base station is frequently referred to as a macro base station and the second base station is frequently referred to as a pico base station.

According to various embodiments, a method is performed in a network node, which can be a network node serving the UE or it can be another node which can communicate with the network nodes in the heterogeneous network in order to provide the relevant information e.g. UE speed as described later. For example the method may be implemented in a node 200, which is exemplarily depicted in FIG. 7. The node 200 can be part of a base station 111. The node 200 can be part of a base station 110. The node 200 can be any network node of the wireless radio network 199 or even be distributed in the wireless network 199. The node 200 can also be part of the UE 100 (see also FIG. 5 and FIG. 6).

Figure 5:
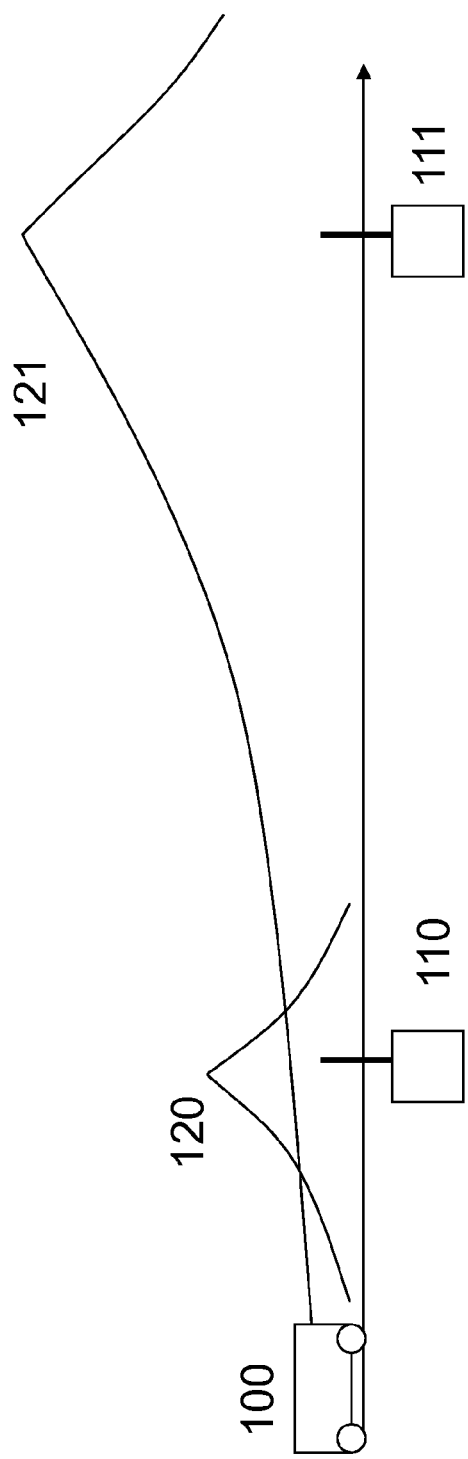
FIG. 5 schematically illustrates an exemplary scenario in which concepts according to various embodiments can be applied.
Figure 6:
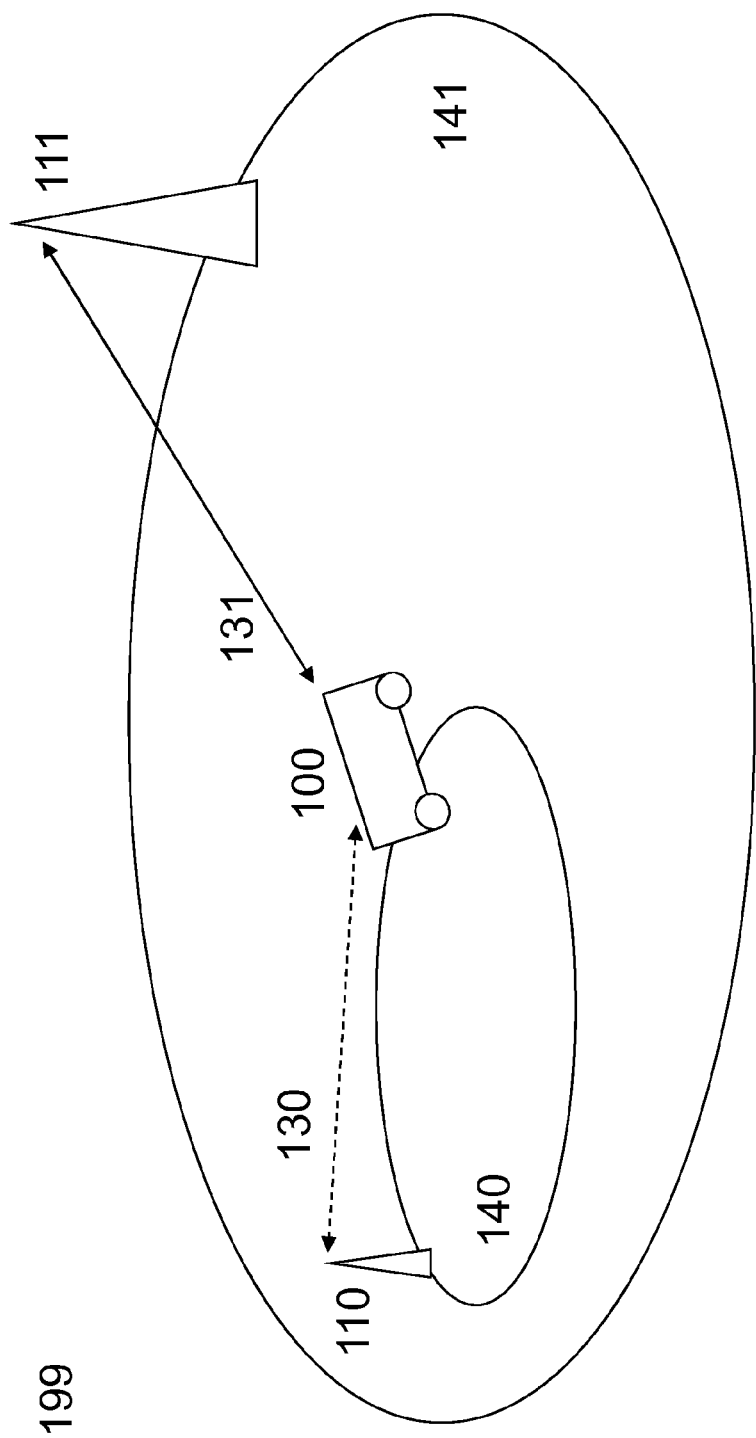
FIG. 6 schematically illustrates an exemplary scenario in which concepts according to various embodiments can be applied.
Figure 7:
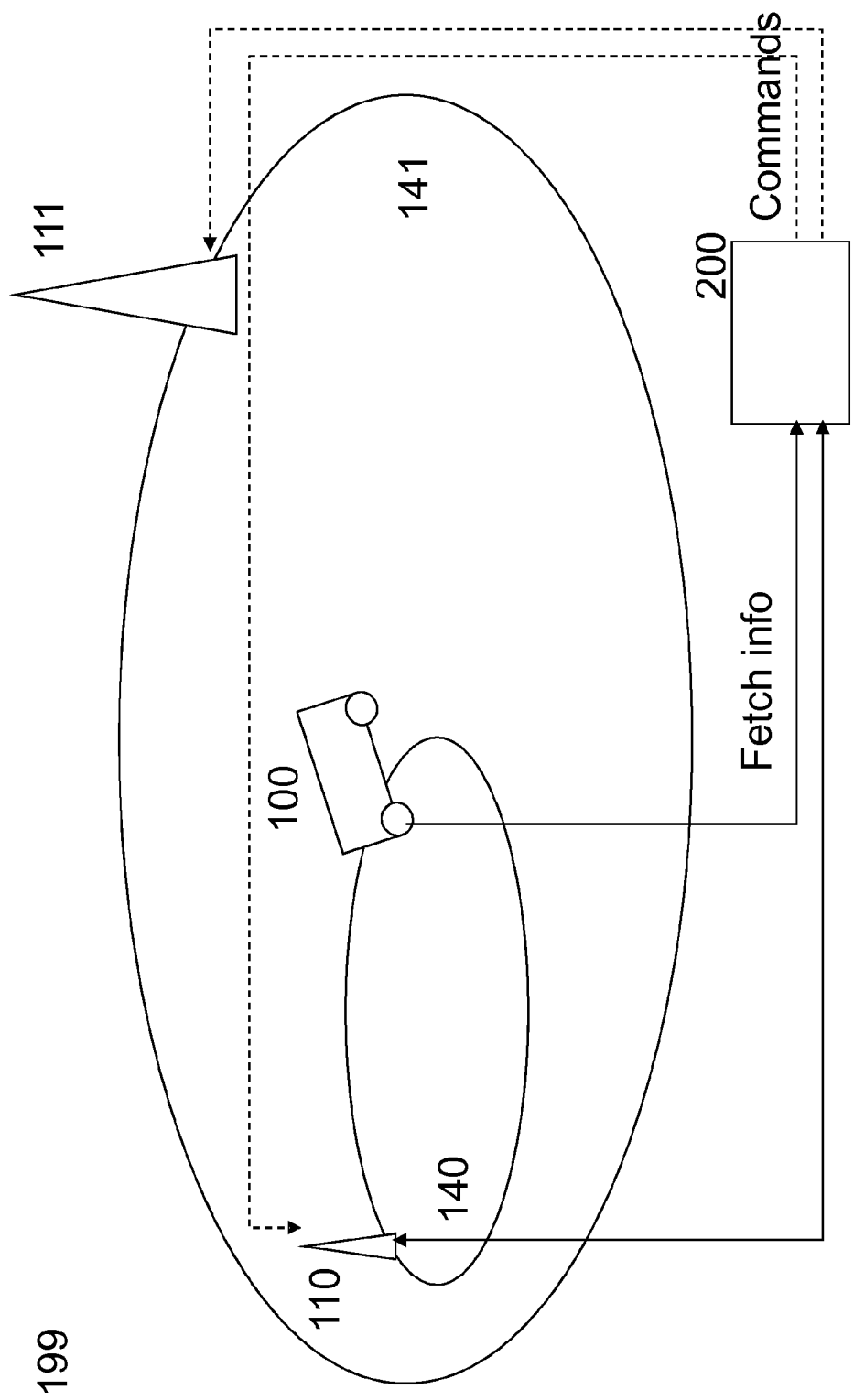
FIG. 7 schematically illustrates an exemplary network environment in which concepts according to various embodiments can be applied.
Figure 8:
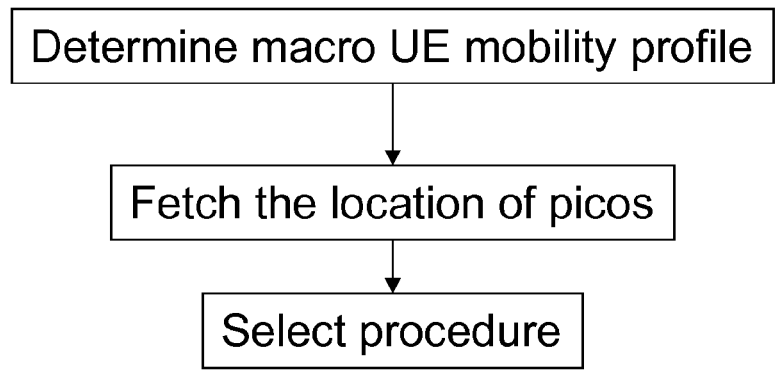
FIG. 8 illustrates a flowchart of a method according to various embodiments.

In the examples of FIGS. 5,6, and 7, the radio network 199 consists of at least one UE 100, at least one LPN (e.g. pico base station 110), and at least one HPN (e.g. macro base station 111) operating in a heterogeneous network. The UE 100 is served by HPN (aka macro BS 111) is termed as macro UE (MUE 100). It is interchangeably referred to as UE 100 or MUE 100.

The method can also be implemented in a MUE especially when in idle or low activity state as described later.

Present embodiments are described for a 2-tier (aka 2-layered) heterogeneous network consisting of HPNs and LPNs. Furthermore, in the embodiments the HPN and LPN are represented by a macro node serving a macro cell and a pico node serving a pico cell. However the present embodiments are applicable for any number of layers (e.g. 3 layers) in a heterogeneous network. Similarly the embodiments are applicable for any type of HPN and LPN. For example LPN can also be a micro or a home base station. Similarly even HPN can be a micro node provided LPN is a pico BS, Home BS, relay node etc. A key aspect is that the HPN operates using higher output power compared to the output power of the LPN. Embodiments are applicable to any RAT (e.g. LTE, HSPA) or any combination of RATs in a multi-carrier system as described later.

Various steps performed and other features as part of various embodiments are listed below and are described in the following. For example, the concepts of the determination of a mobility or mobility profile of a UE (e.g. a macro UE), the determination of location information of pico base station(s), which are normally in the vicinity of the macro BS initially serving the MUE, and the selection of a procedure to handle a link between the UE (e.g. a macro UE) and the network (e.g. macro or pico BS) such as protecting the UE (e.g. the macro UE) from interference are discussed.

The selection step uses at least the determined mobility and pico BS location information. It may also optionally use the characteristics of the service used by the UE. The step of determining a mobility or mobility profile is subsequently discussed with further detail. In this step the node 200 monitors one or more aspects related to the mobility of the UE 100. Examples of aspects related to UE mobility profile are: UE speed, for example it can be obtained by measuring Doppler speed of the UE; UE position, e.g. geographical coordinates or its position with respect to a known reference with a pre-determined location. It can be obtained by using a suitable positioning method such as enhanced cell ID, OTDOA, GNSS, A-GNSS etc. The UE 100 may also report its position to the node 200; UE direction of motion; it can be obtained by measuring direction of arrival of signal e.g. angle of arrival measurement performed by the node 200 or by the serving node; UE acceleration, it can be measured by observing the change in the UE speed; and UE trajectory e.g. overall path of motion etc., this can be represented by two or more set of geographical coordinates along the trajectory followed by the UE 100.

The above information can be obtained by measuring signals transmitted by the UE 100 in which case the measurements can be done in the node 200 or in a serving node. The information can also be obtained by using the measurements done by the UE 100 and reported to node 200 or to its serving node. The UE 100 itself may provide one or more aspects related to its mobility profile and reports them to the node 200. The node 200 normally obtains the above information which is used for selecting a procedure as described in a later section.

The step of determining location information of the second base station(s) is subsequently discussed in further detail. In this step the node 200 may fetch and save positions of a list of those pico base stations, which at least are located close to the macro BS 111 within a certain distance (e.g. 100-500 m) or which are located within the coverage area 141 of the macro BS 111. The coverage area of a macro BS may be pre-defined. It may be corresponding to certain cell radius (e.g. 1500 m). It can also be based on certain minimum received signal strength (e.g. −120 dBm) which in turn is used for determining the coverage in terms of distance. For example certain radio node (e.g. UE) can measure the signal strength and its location or distance from the macro BS where it measures the minimum signal strength corresponds to the macro BS range. In the latter case the coverage may depend upon the frequency band of the serving carrier of the macro UE.

The node 200 may also determine the coverage of each of the pico base stations which is within the macro BS coverage area 141. The pico BS coverage can also be based on the same principles as described above for obtaining the macro BS coverage information.

The location information can be acquired directly from the pico base stations. For example the pico BS may signal absolute values of its geographical coordinates or relative values of its coordinates with respect to a reference value to the node 200. The reference coordinates can be the coordinates of the pico BS's strongest or closest macro BS. The location information can be stored in the node 200 in the background but can also be updated in case new pico base stations are installed or if their locations are changed. The location of pico BS may change more frequently in case it is a mobile relay and housed in a vehicle (e.g. bus, train, boat etc). The location information may be frequently or regularly updated.

The node 200 may also maintain the mapping between the locations (e.g. geographical coordinates) of each macro BS and the corresponding locations of pico base stations, which are inside the macro or are close to the macro BS e.g. within 100-500 meters.

The above determined pico cells are also termed as partially or "fully overlapped pico cells" or simply "overlapped pico cells" in that they at least to some extent overlap with at least one macro cell.

The selection of pico base station and the mapping between pico base stations and macro base stations could also be done statistically, so that only the problematic relationships (e.g. in terms of high HO failure probability) are treated. For instance, if the handover between the macro BS and a specific pico BS has a high probability of handover failures or severe impairments, then it is important that the proposed algorithm lists and treats the relation between the macro BS and this particular pico BS. On the contrary, if probability of handover failures or severe impairments caused by the handover between a macro and a particular pico BS is low, then the relationship between this particular pico BS and the macro BS can be omitted.

The step of selecting a procedure to handle a link between the network and the terminal (e.g. such as improve link quality or to mitigate interference) is subsequently discussed in further detail. In this step node 200 uses the information obtained, i.e. the mobility or mobility profile and location information to perform at least one of the following tasks: Determining the probability of MUE entering and/or staying in pico cell coverage; Assessing the impact of interference from the pico BS on the MUE and/or from the MUE to the pico BS; Selecting an handover procedure and an associated interference mitigation procedure; Configuring UE operating high speed HSPA users to send the signaling radio bearers on a more reliable channel e.g. over DCH instead of HSDPA; Configuring UE in any of the multipoint transmission scheme. The above tasks are elaborated in the following sections:

The concept of determining a probability that a terminal (MUE 100) staying in a pico cell coverage 140 is subsequently considered. The node 200 determines a probability or predicts a possibility of the selected MUE 100 entering a coverage area of one or more pico cells whose location is known. This can be realized by using the information related to the MUE mobility or mobility profile, locations of the pico cell with respect to macro cell, etc. This can also be realized based on statistics accumulated from previous events, for instance using a learning technique or a self-organizing technique (e.g. SON related function). For example, the node 200 uses a determined MUE location and a determined coverage of at least one overlapped pico cell to determine the said probability. This is elaborated with several examples below:

In one example the node 200 can compare the position of the selected MUE 100 to that of pico base station 110 and direction of motion of the MUE 100 to determine the trend of increasing or decreasing distance between the MUE 100 and the pico BS 110. This in turn can be translated into a probability with which the MUE 100 may enter the coverage area of each pico cell.

In another example the node 200 can determine the probability based on the MUE speed or a combination of the MUE speed and its direction of motion. For example if the MUE speed is above a threshold then the probability of MUE 100 staying in pico cell 140 is below a certain level. The node 200 may assume that a MUE moving at a higher speed has a very low probability of staying or spending sufficient time in pico cell coverage. A UE is considered to be moving at 'high speed UE' provided its speed is above a threshold (e.g. speed is 100 km/hr or above, Doppler frequency is 70 Hz or above etc). Therefore at this speed (e.g. ≥100 km/hr UE speed or 70 Hz of UE Doppler frequency etc) the probability for the UE staying in a pico cell can be considered very small. In yet another example a MUE which can traverse the pico cell within a certain time or spends not more than certain amount time in the pico cell (e.g. less than 1 minute) is considered to be a high speed MUE. The threshold in terms of time spent in a pico cell may also depend upon the size of the pico cell e.g. its coverage area, its cell radius etc. The threshold may even depend upon the relation between the size of the macro and the pico cells e.g. radio of their respective cell sizes etc.

In yet another example the node 200 monitors the measurement reports of downlink radio measurements sent by the MUEs so as to identify when the MUE 100 enters the pico coverage 140. The downlink radio measurements are performed on serving macro BS and may also be those performed on one or more overlapped pico cells. Examples of DL radio measurements are RSRP, path loss, RSRQ etc in LTE. It may also combine it with the MUE mobility profile (e.g. MUE position, direction, speed etc) to more accurately determine the probability of MUE entering the pico coverage and the expected time spent there. For example if the signal measurement indicates that MUE is close to the pico cell coverage, its direction is towards the pico cell coverage and its speed is below a threshold (e.g. 30 km/hr) then node 200 may assume that the probability of entering the MUE 100 in pico cell coverage 140 and staying there is high e.g. more than 80%.

In yet another example, node 200 monitors when the MUE 100 enters the pico cell coverage 140 and creates a statistical mapping between parameters such as UE position, speed, speed direction, etc, and the probability for the MUE 100 to enter the pico cell coverage.

In yet another example node 200 also monitors the exit of the MUE 100 from the pico cell coverage, computes the time spent in the pico cell coverage 140, and creates a statistical mapping between the parameters such as UE position, speed direction etc to the expected time to be spent in the pico cell coverage.

The concept of assessing an impact of interference is subsequently discussed in further detail. The propagation characteristics between MUE and the two types of base station (serving macro BS and overlapping pico BS) may be such that the power of the signal received from the pico BS exceeds the power received from the macro BS within a certain area. This area is typically small compared to the size of the serving macro cell. However there can be multiple similar areas within the macro cell coverage since typically multiple pico cells (e.g. 2-4 pico cells) are located within a single macro. In other words the macro UE can receive better quality signals from the pico BS compared to that received from its serving macro BS. FIG. 5 illustrates the power of the signal received from the pico and from the macro by the curves 120 and 121, respectively. The two base stations create two cells, 140 and 141, respectively, so that the area covered by the small cell 140 overlaps with the macro cell 141 (see FIG. 6 and FIG. 7). Depending upon the MUE location in the macro and in the overlapping cells, the MUE downlink performance may be adversely affected due to the aggressor pico BS. Similarly the MUE which transmits at higher output power to its serving macro BS may cause interference on one or more of the victim pico base stations. This in turn deteriorates both MUE DL performance and victim BS UL performance.

A MUE which is expected to spent sufficient amount of time in pico cell coverage as determined in previous step is used for assessing the impact of interference from pico BS on MUE. The node 200 selects the MUEs which exhibit certain mobility profile e.g. UE with certain estimated speed, UE located at cell border of the macro cell or closer to a pico cell etc. For example if the probability of MUE staying in a pico cell is above a threshold (e.g. at least 50%) and/or if the expected time spent by the MUE in a pico cell is above a threshold (e.g. 1 minute) then node 200 assesses the impact of the interference on MUE. The impact of the interference means the impact of downlink transmissions from the overlapped pico cell(s) on the MUE downlink received signal quality and/or the impact of the MUE uplink transmission on the reception of the overlapped pico cell. In this scenario the pico cell may therefore act as an aggressor and a victim in the downlink and uplink directions respectively.

In order to assess the impact on the MUE downlink performance, the node 200 may then obtain information related to the downlink signal quality of the selected MUE. The downlink signal quality is based on one or more of the following: downlink radio measurements performed by MUE on serving macro cell, downlink radio measurements performed by MUE on serving macro cell, relative downlink radio measurements performed on the serving macro and the pico cell performed by MUE for comparing signal received from the two types of cells etc. Examples of DL radio measurements are RSRP, RSRQ, HARQ performance (e.g. ACKNACK for DL data reception), BLER of DL reception, SINR of DL reception etc. If one or more DL quality metric is below a reference value then node 200 assume that the MUE DL quality is below a threshold and the impact of the aggressor pico cell on the DL reception of signals at the MUE receiver is worse than the acceptable level. To further improve the results of the DL interference assessment the node 200 may also obtain information related to the DL transmissions from the aggressor pico base stations (i.e. which overlaps with macro coverage and close to MUE). Examples of DL transmissions are DL cell load (e.g. number of channels used, number of users etc), DL transmit power etc. In case both DL MUE signal quality is below a threshold and DL transmission load in the aggressor pico cell is above a threshold then node 200 may assume that the impact on MUE quality is worse than acceptable limit.

In order to assess the impact on the victim pico cell uplink performance, the node 200 may obtain information related to the uplink signal quality of the selected pico cell(s) where MUE is expected to certain amount of spent time. The uplink signal quality is determined, e.g., based on UL measurements performed by pico base stations. Example of uplink measurements are UL received power (e.g. received interference power in LTE), UL received SINR, UL BLER etc. If at least one of the UL signal quality measurements is worse than the respective threshold then node 200 may consider that UL performance of pico cell is below an acceptable limit. More specifically if SINR is below a threshold and/or UL received power is above a threshold then the UL performance of that victim pico cell is considered to be worse than an acceptable limit. The node 200 may also use another criteria related to MUE transmissions such as MUE uplink transmit power related measurement (e.g. MUE average transmit power, MUE power headroom (PH) which is difference between maximum output power and actual transmitted power in dB scale) to further assess the impact on the receiver of the victim pico cells. For example if the MUE transmit power is above a threshold and/or PH is below a threshold then node 200 may consider the impact on UL performance of the victim pico cell is more severe and may result in deterioration of UL quality. The node 200 may use both criteria (UL signal quality and MUE UL transmissions) to assess the impact of MUE on the UL performance of the victim cell.

The node 200 may also combine the above embodiments. That is it may use both the determined impact of the downlink transmissions of the overlapping pico cell(s) on the MUE received quality and the determined impact of the uplink transmissions of the MUE on the UL performance at the receiver of the overlapping pico cell(s) to assess the overall interference situation of the MUE and the overlapping pico cell(s).

The node 200 may also collect information about the MUE position, MUE speed, time spent in the pico cell coverage area, the performance degradation, and/or the occurrence of failures, and may continuously update a statistical relationship between these measures. Then, based on these statistics and on MUE position, MUE speed, etc, node 200 may estimate the probability for acceptable performance degradation, or for a handover failure, or other types of failure. The predicted performance degradation could be combined with the aforementioned assessments of the interference situation into one overall assessment criterion.

The concept of selecting or recommending a procedure to handle a link or to mitigate interference is subsequently discussed in further detail. For example, depending on an interference situation, such as the interference situation of the MUE DL and/or overlapping pico base UL, the node 200 may select one or more of the following procedures to handle the link such as interference mitigation procedures or tasks to alleviate or at least reduce the interference towards MUE and/or pico BS:

1. Configuration of a low interference time-frequency resources (e.g. ABS) in one or more pico base stations to protect macro UE from the interference caused by the pico base station(s);
2. Performing a cell change of the macro UE to one of the pico base stations;
3. Performing a cell change of the macro UE to a cell on a carrier frequency which is different than that of the macro cell and/or pico cell e.g. an inter-frequency or inter-RAT carrier frequency;
4. Neither configuring the said low interference time-frequency resources nor performing the said cell change;
5. Introducing time shifting between signals transmitted by macro and pico cells.

One or more of the above procedure may be executed depending upon additional factors or conditions in addition to the higher interference experienced by the MUE and/or by the overlapping pico BS. Depending upon the type of the selected procedure the MUE 100 may receive the corresponding configuration information from the node 200 or from its serving BS. Similarly depending upon the selected procedure the victim pico node will also receive the necessary configuration information from the node 200 or from another neighboring BS e.g. macro BS111. Several examples are used to elaborate this embodiment.

In one example, even if the MUE is in pico cell coverage but if the assessed interference is below a threshold and/or if the predicted dueling time is below threshold, and/or the predicted performance degradation is small, then no action is taken (i.e. procedure 4). The serving node will normally perform handover of the MUE to the pico BS.

In another example the MUE 100 may have to be kept connected to its serving macro BS 111 through the radio connection 131 even when it passes through the pico cell 140, which when traversed becomes the strongest cell. Due to the proximity of the pico, there will be strong interference 130 between the MUE and the pico cell. That means macro UE 100 will suffer strong interference in the DL from the pico cell. In addition the receiver of the macro UE 100 will cause strong interference in the UL to the receiver of the pico BS. The latter stems from the fact (as also explained earlier) that the macro UE typically operates with higher output power to ensure that its transmitted signal is successfully reached at its serving macro BS, which is much further compared to the victim pico BS. The interference situation may become even worse in case the macro UE 100 is close to more than one pico cells. Nevertheless the DL interference experienced by the MUE from the pico cell is high and/or MUE causes higher interference to the overlapping pico base station but the MUE is still connected its serving macro BS. This can be due to one or several reasons. For example in one scenario the pico cell belongs to CSG and therefore the macro MUE 100 is not allowed to be served by the pico cell regardless of the signal quality perceived by MUE 100 from the pico cell. In another scenario the expected amount of time spent by the MUE in the pico cell coverage is below a threshold (e.g. either pico cell is small and/or MUE speed is high). In another scenario the cell change (e.g. handover) to pico cell is not performed by the serving macro cell to avoid signaling overheads and interruptions. In yet another scenario the cell change is not performed to avoid the risk of cell change failure, call dropping etc. The node 200 therefore instead of doing a cell change to the strongest pico cell may instead configures the low interference time frequency resources (e.g. ABS) subframes in the aggressor pico cell(s) to protect the DL reception of the MUE (i.e. selects procedure 1). The configuration of the low interference time frequency resources can also be based on statistics of plurality of the MUE over the past duration e.g. over the last 5-30 minutes. That is if similar situation is experienced by several MUEs in that coverage area then ABS may be configured at least for certain amount of time. In this way MUE can receive signals from their serving base stations with better quality while traversing the overlapping pico cells without changing cells. The node 200 also reconfigures the macro and the pico base station so that they resume the operation without ABSF once the MUE operating in one or more of the above scenarios has left the coverage area of the pico cell coverage and/or when the probability of another MUE to enter the pico cell coverage is below a threshold (e.g. 10%).

In yet another example if the assessed interference is high (e.g. MUE DL quality is worse than a threshold and/or pico cell UL interference is higher than a threshold) the node 200 may select procedure 3 to mitigate interference situation. For example the node 200 may perform cell change of the MUE to another cell operating on a non-serving carrier frequency, which may belong to the same RAT of the old serving cell (i.e. inter-frequency cell change) or to another RAT (e.g. inter-RAT cell change). To execute this procedure the macro BS will be instructed to send a cell change command to the MUE. The node 200 may select procedure 3 when for example pico cell is CSG such that intra-frequency cell change is not possible or when pico cell has high load so that ABS configuration at the pico cell to protect MUE DL will reduce the capacity of the pico cell (i.e. available resources for pico UEs).

In yet another embodiment node 200 reconfigures the start timing of signals transmitted by the macro and the pico cells when the assessed interference (especially at MUE DL) is higher than the acceptable limit. For example their frame start timing can be shifted by certain time offset so that the two types of base stations don't transmit the same type of signals at the same time. Different subframes may contain different types of signals. For example in LTE some vital signals such as synchronization signals (PSS/SSS), physical broadcast channel (PBCH) and system information block 1 (SIB 1) are transmitted in subframes 0 and 5, subframe 0 and subframe 5 respectively. For example the start of the frames in macro and pico cells can be shifted such that subframe 0 in macro cell overlap with subframe 3 in pico cell. In this way the above mentioned vital signals will not collide and therefore the MUE may receive them with good quality while passing through pico cell coverage.

In yet another example, node 200 fetches information about which MUE is capable of performing interference mitigation of interference received from an aggressor cell (e.g. ability to cancel the Cell-specific Reference Signals CRS, synchronization signals, PBCH signals, control signals etc). If any MUE which is expected to spend certain amount of time above a threshold in pico cell is identified and if the probability of this MUE to approach the coverage area of the pico cell coverage is large, then node 200 does neither performs cell change to pico cell nor it configures ABS in the pico cell. Instead the node 200 sends to the MUE support information needed for more efficient interference mitigation. Examples of support information are the cell identifiers, transmit power level, antenna configuration, transport format of signals (e.g. modulation, coding etc) etc used by the pico base station which causes interference to the MUE DL signal reception. The MUE uses the received information to more effectively mitigate the interference thereby is able to receive the desired signal from its serving macro BS while passing through the coverage of the pico cell(s).

Under high speed the UE may loose critical signaling especially the signaling sent to the HSPA UE over HSDPA radio bearer. For example a cell change command sent to the UE over HSDPA may be partially or fully lost and may result in delay in the cell change or even cell change failure. Therefore in yet another exemplary embodiment node 200 identifies HSPA users (i.e. which are HSPA capable and currently operating in HSPA) with high mobility profile and configures these UEs so that they are able to receive the signaling radio bearer (SRB) over a more reliable transport channel e.g. the dedicated channel (DCH). The SRB is generally sent using RRC protocol to the UE. The use of DCH for SRS transmission in turn will reduce the risk of serving cell change failure. This is because transmission of SRB over DCH is more reliable than over HSDPA. It is on the signaling radio bearer that the serving cell change command is sent on the downlink. The node 200 when configuring UE with a more reliable channel for SRS transmission may further take into account whether the UE is capable of supporting the target cell re-pointing feature or not. In the target cell re-pointing feature in addition to the serving cell change command which is sent from the serving cell an indication is also sent from the target cell. This reduces the risk of serving cell change failure. If the HSPA UE does not support target cell re-pointing feature then the network node 200 may configure the UE with a more reliable channel for SRS transmission e.g. DCH. This is because if the UEs are not capable of this feature and are moving with a speed above a threshold (e.g. speed is 100 km/hr or above, Doppler frequency is 70 Hz or above etc) then they are identified as high-speed UEs. Depending on the characteristics of the service used by these UEs, node 200 may move them to DCH and thereby reduce the risk of serving cell change failures.

In yet another exemplary embodiment the network node 200 may configure a UE with high mobility profile in any of the multipoint transmission scheme (e.g. multipoint HSPA, CoMP etc) enabling the UE to receive data from at least a macro BS and from at least one determined pico BS. This in turn will increase the reliability of signals received at the UE when a high speed macro UE traverses coverage of one or more pico cells. This in turn will also offload the macro BS since some of the data can be sent via pico base station(s).

The concept of selecting or recommending a procedure to handle a link such as an interference mitigation procedure in a terminal (MUE) is subsequently discussed in further detail. The procedures to handle a link such as interference mitigation procedures described above may also be partly or fully selected by MUE. The MUE may perform these actions or recommend them to the serving macro BS.

In one example the MUE may also recommend the node 200 or to its serving BS the most appropriate procedure if it detects its DL received signal quality is bad or not sufficient while being served by a macro cell but being in or approaching the coverage of a pico cell. The MUE may send an identifier of the pre-determined procedures (e.g. 5 procedures listed above). The MUE can assess the coverage of the pico cell based on the DL measurements performed on pico cells and on its serving macro cell. The node 200 or its serving macro cell may also signal the coordinates of the overlapping pico cells. This information may further be used by the MUE to assess the time it expects to spend in the pico cell. The MUE may also use its mobility or mobility profile (e.g. speed, direction etc) to assess the expected time in the pico cell coverage and/or probability with which it will enter the pico cell coverage. The node 200 or the serving macro BS receives the recommended procedure and may select the recommended procedure and may configure the MUE and the pico BS with the appropriate parameters associated with the procedure. In order to further improve the selection of the procedure the node 200 may also select a procedure based on both MUE reported recommendation and the determination performed by itself (as described in section 6.3.4). For example the node 200 may eventually select a procedure which is recommended by the MUE as well as which is determined by itself. In case the MUE recommended one does not match with the one determined by itself then the node 200 may select the latter one.

In low activity state (e.g. idle mode) the MUE may autonomously select a procedure based on the assessed downlink interference from the overlapping pico cells and based on its determined mobility profile. For example if the expected amount of time spent in the pico cell is very small then MUE may not perform any cell reselection to pico cell (i.e. selects procedure 4). On the other hand if the expected amount of time spent in the pico cell is large then MUE may perform cell reselection to a cell on an inter-frequency carrier or inter-RAT carrier (i.e. selects procedure 3). The MUE in idle mode may also store the statistics related to a selected procedure under different scenarios e.g. mobility profile, pico coverage, DL interference situation etc. The MUE may report such statistics to its serving BS when it can transmit signals in the UL e.g. when MUE goes into a connected state. So according to one principle, the procedure to handle the link between the network and the terminal is selected on the basis of an activity state of the terminal.

In yet another example a MUE in idle state when expecting to spent small amount of time in a pico cell coverage (as determined by its mobility profile etc) may not perform a cell reselection to the pico cell even when this pico cell is strongest or causes strong interference to the MUE receiver and may instead select an advanced receiver (e.g. interference mitigation receiver) for one or more of the following purposes: For receiving signals from its camped on cell (i.e. macro BS); For performing DL radio measurements on camped on macro BS and neighboring cells.

In yet another example a MUE in idle state may select a procedure or a task based on one or more pre-defined rules. For example it may be pre-defined that the MUE will select a procedure depending upon the perceived interference. For instance the downlink quality level can be mapped on different procedures to be selected by the MUE. If the downlink quality measured by the MUE is below first threshold then MUE may be required to do a cell change to pico cell. If downlink quality is below second threshold (which is less than the first one) then MUE may perform inter-frequency or inter-RAT HO. If the DL quality is further below third threshold (which is even less than the second one) then MUE may use advanced receiver.

In another example it may be pre-defined that MUE may use advanced receiver provided the DL quality is below certain threshold and MUE battery is above a threshold. The use of advanced receiver consumes more battery power and will degrade battery like since MUE is most of the time in idle mode.

There are several advantages associated with various described embodiments. For example, a probability of call dropping and/or cell reselection failures is reduced by avoiding unnecessary cell changes. The risk of loosing paging reception is reduced since unnecessary cell reselections are avoided by the MUE when in idle state. The overall signaling overheads, delays and interruption caused due to cell change are reduced due to a reduction in cell changes. The DL reception quality of a signal at the receiver of a MUE in a heterogeneous network can be improved. The UL reception quality of a signal at the receiver of a pico BS in a heterogeneous network can be improved.

The embodiments are partly described by considering examples in which serving base station (e.g. eNB) is assumed to be a pico or maco base station, neighboring base stations are assumed to be pico base stations and aggressor base station(s) are assumed to be macro base stations. However the embodiments are not limited to pico and macro base station scenarios.

In one example the serving BS (aka serving cell), neighbor BSs (aka neighboring cells) can be any type of lower power nodes and aggressor BS (aka aggressor cell) can be any type of high power node. Examples of lower power nodes are local area base station (aka pico BS as it serves a pico cell), medium range base station (aka micro BS as it serves a micro cell), femto or home base station (aka femto cell as it serves a femto cell).

In yet another example the serving BS can be even a high power node e.g. macro BS. For example a serving macro BS may signal the measurement pattern and the neighbor cell list for enabling the UE to perform measurements on cells served by lower power nodes (e.g. pico BSs) which are interfered by an aggressor cell. The aggressor cell can be the serving macro BS itself or another macro BS.

The embodiments are partly described for specific patterns (e.g. ABS configured in aggressor cell and restricted pattern neighbor victim cells). However the embodiments are equally applicable to other signal transmit pattern comprising of lower power or low interference subframes. The embodiments are also equally applicable to other signal transmit pattern comprising of lower power or low interference time-frequency resources (e.g. certain RBs in certain time slots or subframes).

The embodiments described are also applicable to each serving cell or each carrier frequency used by the terminal (MUE) when the MUE operates in multi-cell scenarios (aka multi-carrier scenarios). Examples of multi-cell scenarios are carrier aggregation or multi-carrier, CoMP, CoMP with carrier aggregation etc. The method may be applied for each cell or carrier independently or jointly depending upon the multi-cell scenario. For example in carrier aggregation each carrier typically has a different aggressor cell whereas in CoMP with single carrier all serving cells may have the same aggressor cell.

Modifications and other variants of the described embodiment(s) will come to mind to one skilled in the art having the benefit of the teachings presented in the foregoing description and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for the purpose of limitation.

ABBREVIATIONS

ABS Almost blank subframe
CC Component carrier
CRS Cell-specific Reference Signal
eNodeB evolved Node B
E-SMLC Evolved SMLC
eICIC Enhanced ICIC
HPN High Power Node (such as a macro base station)
ICIC Inter-cell Interference Coordination
IE Information Element
LPN Low Power Node (such as a pico base station)
LTE Long-Term Evolution
MBSFN Multicast broadcast single frequency network
MUE Macro user equipment
PCC Primary component carrier
RRU Remote radio unit
RSRP Reference Signal Received Power
RSRQ Reference Signal Received Quality
SCC Secondary component carrier
UE User Equipment
SF-DC Single Frequency Dual-Cell HSDPA
RRC Radio Resource Control
UE User Equipment
RNC Radio link controller
MDT Minimization of drive tests
SON Self Organizing Network
HSDPA High speed downlink packet access
OAM Operation and Maintenance system
OSS Operational Support Systems
HS-DSCH High Speed Downlink Shared Channel

The invention claimed is:

1. A method for handling a link between a network and a mobile terminal, wherein the network comprises a first base station serving the mobile terminal and a second base station, the method comprising:
    determining a mobility of the mobile terminal moving through a coverage area of the first base station;
    determining location information of a coverage area of the second base station that is deemed to have at least partially overlapping coverage with the first base station;
    predicting that the mobile terminal will enter said coverage area of the second base station, or predicting that the mobile terminal will stay in said coverage area of the second base station at least for a predefined period of time;
    selecting, based on the determined mobility, the determined location information, and the prediction, a procedure to improve a quality of the link for the mobile terminal; and
    initiating performance of the selected procedure.

2. The method of claim 1, wherein the selecting comprises selecting a handover procedure to the second base station or a procedure to mitigate interference from the second base station.

3. The method of claim 1, further comprising checking, based on the determined mobility and the location information, whether the quality of the link can be improved by a procedure to improve a quality of the link for the mobile terminal.

4. The method of claim 3, wherein the selecting is further based on the checking.

5. The method of claim 1:
further comprising predicting a link quality of the link between the network and the mobile terminal; and
wherein the selecting is further based on predicting.

6. The method of claim 1, wherein the selecting is further based on a service used by the mobile terminal.

7. The method of claim 1, wherein selecting is further based on a probability of failure of a handover procedure of the mobile terminal between the first base station and the second base station.

8. The method of claim 1:
wherein the predicting comprises at least one of:
determining a probability that the mobile terminal will enter a coverage area of the second base station; and
determining a probability that the mobile terminal will stay in the coverage area of the second base station at least for a predefined period of time;
wherein the selecting is further based on at least one of:
the probability to enter; and
the probability to stay.

9. The method of claim 1, further comprising sending a recommendation of the selected procedure to a node.

10. The method of claim 1, wherein the first base station is operated on a higher power level than the second base station.

11. The method of claim 1, wherein the first base station and the second base station operate on the same frequency.

12. The method of claim 1, wherein the mobility of the mobile terminal comprises a mobility profile of the mobile terminal.

13. The method of claim 12, wherein the mobility profile comprises at least one of:
a speed of the mobile terminal;
a direction of motion of the mobile terminal;
a location of the mobile terminal;
a mobility classification;
an acceleration of the mobile terminal; and
a path of motion.

14. The method of claim 1, wherein selecting comprises selecting at least one of:
configuring a low interference time-frequency resource in the second base station to protect the mobile terminal from interference caused by the second base station;
performing a cell change of the mobile terminal to a cell operating on a frequency different to the frequency of the first base station and/or the second base station;
performing a cell change of the mobile terminal to a cell operating on a radio access technology different to the radio access technology of the first base station and/or the second base station;
preventing a configuration of a low interference time-frequency resource in the second base station;
preventing a cell change;
introducing time shifting between transmissions of the first base station and transmissions of the second base station;
sending signaling via a new link having higher reliability;
configuring the mobile terminal according to a new link having higher reliability for signaling;
sending signaling via the second base station; and
sending data via the second base station.

15. The method of claim 1, wherein the mobility is indicative of a future movement of the mobile terminal.

16. The method of claim 1, further comprising determining, based on the determined mobility and the location information, that the mobile terminal will enter a coverage area of the second base station.

17. The method of claim 1, wherein the method is performed in a node of the network or in a network.

18. The method of claim 1, wherein the method is performed in the first base station.

19. The method of claim 1, wherein the method is performed in the mobile terminal.

20. The method of claim 1, wherein the selecting comprises selecting at least one of:
preventing handover to the second base station;
a receiver procedure to mitigate interference from the second base station;
performing a cell reselection to a cell operating on a different frequency; and
performing a cell reselection to a cell operating on a different radio access technology.

21. The method of claim 1, wherein the first base station is a first radio network node and the second base station is a second radio network node.

22. The method of claim 1, wherein the coverage area of the second base station is fully within the coverage area of the first base station.

23. The method of claim 1, further comprising determining an expected level of interference between the mobile terminal and the second base station and the selecting is further based on the expected level of interference.

24. The method of claim 1, wherein the selecting is further based on at least one of:
a determined first signal quality between the first base station and the mobile terminal;
a determined second signal quality between the second base station and the mobile terminal;
a recommendation of a procedure to improve the link quality for the mobile terminal received from another node.

25. An apparatus for handling a link between a network and a mobile terminal, wherein the network comprises a first base station serving the mobile terminal and a second base station, the apparatus comprising a processor and a memory, the memory containing instructions executable by the processor whereby the apparatus is configured to:
determine a mobility of the mobile terminal moving through a coverage area of the first base station;
determine location information of a coverage area of the second base station that is deemed to have at least partially overlapping coverage with the first base station;
predict that the mobile terminal will enter said coverage area of the second base station, or predicting that the mobile terminal will stay in said coverage area of the second base station at least for a predefined period of time;
select, based on the determined mobility, the determined location information, and the prediction, a procedure to improve a quality of the link for the mobile terminal; and
initiate performance of the selected procedure.

26. The apparatus of claim 25, wherein the apparatus is configured to select, based on the mobility and the location information, a handover procedure to the second base station or a procedure to mitigate interference from the second base station.

27. The apparatus of claim 25, wherein the apparatus is a node of the network or a network.

28. The apparatus of claim 25, wherein the apparatus is the first base station.

29. The apparatus of claim 25, wherein the apparatus is the mobile terminal.

30. A computer program product stored in a non-transitory computer readable medium for handling a link between a network and a mobile terminal, wherein the network comprises a first base station serving the mobile terminal and a second base station, the computer program product comprising software instructions which, when run on at least one processing circuit of a node for a cellular network, causes the node to:
- determine a mobility of the mobile terminal moving through a coverage area of the first base station;
- determine location information of a coverage area of the second base station that is deemed to have at least partially overlapping coverage with the first base station;
- predict that the mobile terminal will enter said coverage area of the second base station, or predicting that the mobile terminal will stay in said coverage area of the second base station at least for a predefined period of time;
- select, based on the determined mobility, the determined location information, and the prediction, a procedure to improve a quality of the link for the mobile terminal; and
- initiate performance of the selected procedure.

* * * * *